(12) United States Patent
Bloom et al.

(10) Patent No.: US 8,947,253 B2
(45) Date of Patent: Feb. 3, 2015

(54) IMMERSIVE VEHICLE MULTIMEDIA SYSTEM

(75) Inventors: David Bloom, Palo Alto, CA (US); Jeff Zabel, Palo Alto, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1265 days.

(21) Appl. No.: 12/503,551

(22) Filed: Jul. 15, 2009

(65) Prior Publication Data

US 2011/0016497 A1 Jan. 20, 2011

(51) Int. Cl.
*H04N 7/18* (2006.01)
*B60K 35/00* (2006.01)
*H04N 21/414* (2011.01)

(52) U.S. Cl.
CPC *H04N 7/18* (2013.01); *B60K 35/00* (2013.01); *H04N 21/41422* (2013.01)
USPC ........ 340/691.1; 340/438; 340/439; 340/440; 340/441; 340/5.64; 340/541; 701/124; 725/75; 710/124; 463/31; 463/37; 463/42; 358/426.02; 273/317

(58) Field of Classification Search
USPC ............... 340/438–441, 449, 5.64, 5.72, 541, 340/691.1; 463/31, 37, 42; 273/317; 701/36, 124; 358/108; 710/124; 725/75
See application file for complete search history.

(56) References Cited

U.S. PATENT DOCUMENTS

| | | | |
|---|---|---|---|
| 5,061,997 A | 10/1991 | Rea et al. | |
| 5,951,664 A * | 9/1999 | Lambrecht et al. | 710/124 |
| 6,080,063 A | 6/2000 | Khosla | |
| 7,211,000 B2 * | 5/2007 | Jutzi et a | 463/40 |
| 7,369,903 B2 | 5/2008 | Diederiks et al. | |
| 8,083,589 B1 * | 12/2011 | Kavars et al. | 463/36 |
| 2003/0210132 A1 * | 11/2003 | Tang et al. | 340/5.64 |
| 2006/0212197 A1 * | 9/2006 | Butler et al. | 701/36 |
| 2007/0149284 A1 * | 6/2007 | Plavetich et al. | 463/37 |
| 2008/0077882 A1 * | 3/2008 | Kramer et al. | 715/810 |
| 2010/0280641 A1 * | 11/2010 | Harkness et al. | 700/94 |

* cited by examiner

*Primary Examiner* — Benjamin C Lee
*Assistant Examiner* — Chico A Foxx
(74) *Attorney, Agent, or Firm* — Barley Snyder (57) ABSTRACT

The invention relates to an immersive vehicle multimedia system that that is affected by vehicle sensors and collected data concerning environmental. The immersive vehicle multimedia system includes a vehicle, at least one sensor or other vehicle component gathering input as data from an external and internal vehicle environment, an immersive multimedia device connected to each sensor, and media content run through the multimedia device. The media content includes a primary script and a secondary script, the secondary script depending on the gathered input.

21 Claims, 8 Drawing Sheets

IMMERSIVE VEHICLE MULTIMEDIA SYSTEM

FIELD OF THE INVENTION

The invention relates to an immersive vehicle multimedia system that that is affected by vehicle sensors and collected data concerning environmental and current driving conditions.

BACKGROUND

The concept of immersion is to make a user feel like they are part of the simulated environment. The success with which an immersive digital environment can actually immerse the user is dependent on many factors. Technology, such as three-dimensional graphics, surround sound, interactive user-input and other factors such as simplicity, functionality and potential for enjoyment have allowed multimedia users the ability to become immersed into media content. In fact, immersive digital environments are readily known, where realistic environmental effects such as wind, seat vibration and ambient lighting, are used to develop and further an interactive immersive experience.

U.S. Pat. No. 7,369,903 discloses a type of ambient lighting technology that generates light effects around a television, the light effects being dependent on the type of video content being displayed and having the effect of a more immersive viewing experience.

The patent relates to the on-line analysis of meta-data that is received together with a video signal. This analysis results in an adaptation of the lighting surrounding the presentation device (110). One or more characteristics of the meta-data are filtered out and translated into lighting settings of one or more light elements (102, 104, 106, 108), which in turn can contain one or more light sources.

The '903 patent illustrates an embodiment of an ambient light environment. Here, 100 illustrates a living room in which light elements, 102, 104, 106, 108, and 112 are positioned. The light elements can comprise LED illumination cells of different colors like red, green, and blue. Other colors and other light emitting resources, like conventional light, can also be used.

The television 110 receives and processes a television signal and the processed television is shown on its screen. The television 110 can be an analog or a digital television signal receiver. The television signal can be received via a satellite dish, cable, storage device, internet etc. Furthermore, the television signal can in general be a video signal or an image as can be stored upon a VCR, CD, DVD, a Game machine a PC etc. The living room 100 contains also other furniture like chairs 116, 118, and 120 and a table 122. The positions of the furniture and the shown furniture is only meant as an example to illustrate the invention that allows realization and change of both ambiance and light effect in combination with video, games, audio, etc.

U.S. Pat. No. 6,080,063 describes a method and apparatus for simulating participation in a live event. The apparatus operates by gathering input from the live event through sensors located at the live event, and by gathering user input from a remote participant through a user interface. These inputs are transmitted to a computer system where they are used to generate a display of the simulation, which reflects what is actually happening at the live event, as well as the effect of user commands on the live event simulation. The display includes "entities" corresponding to real participants in the live event as well as "entities" corresponding to simulated participants in the live event. In the '063 patent, an example is well described where the event is an automobile race. Sensors at the race periodically record the position of real automobiles participating in the race. This position information is relayed to the computer system where it is used to construct a display of the automobile race showing the real vehicles in their proper locations. Commands received from the user interface control a simulated vehicle in the display. By issuing commands through the user interface, a remote participant navigates the simulated vehicle in and out of the real vehicles in the display. In this way, the excitement a highly interactive video game is combined with the drama and publicity surrounding a live event.

As discussed, the '063 patent permits remote participants to effectively "compete" with the real participants in the live event, creating an artificial but immersive experience. However, there is no immersive effect or simulation concerning actual external surroundings. Rather, the prior art prepares a simulation according to limited conditions occurring at a remote external location, which is not currently encountered by the participant.

Often, occupants of moving vehicles will utilize traditional video games and entertainment devices to divert their attention from their travel. The occupant becomes distracted and removed, while becoming less integrated with the current environment.

SUMMARY

The present invention relates to an immersive vehicle multimedia system that is affected by vehicle sensors and collected data concerning environmental, as well as current the driving conditions.

The immersive vehicle multimedia system, provides an occupant with an immersive experience, and includes a vehicle, at least one sensor gathering input from the environment, an immersive multimedia device connected to each sensor, and media content run through the multimedia device, the media content having a primary script and a secondary script. The secondary script is dependent on gathered input from the sensors.

BRIEF DESCRIPTION OF THE DRAWINGS

The invention will be explained in greater detail with reference to embodiments, referring to the appended drawings, in which.

DETAILED DESCRIPTION OF THE EMBODIMENT(S)

The invention will now be described in greater detail with reference to FIGS. 1 through 7.

Figure 1:
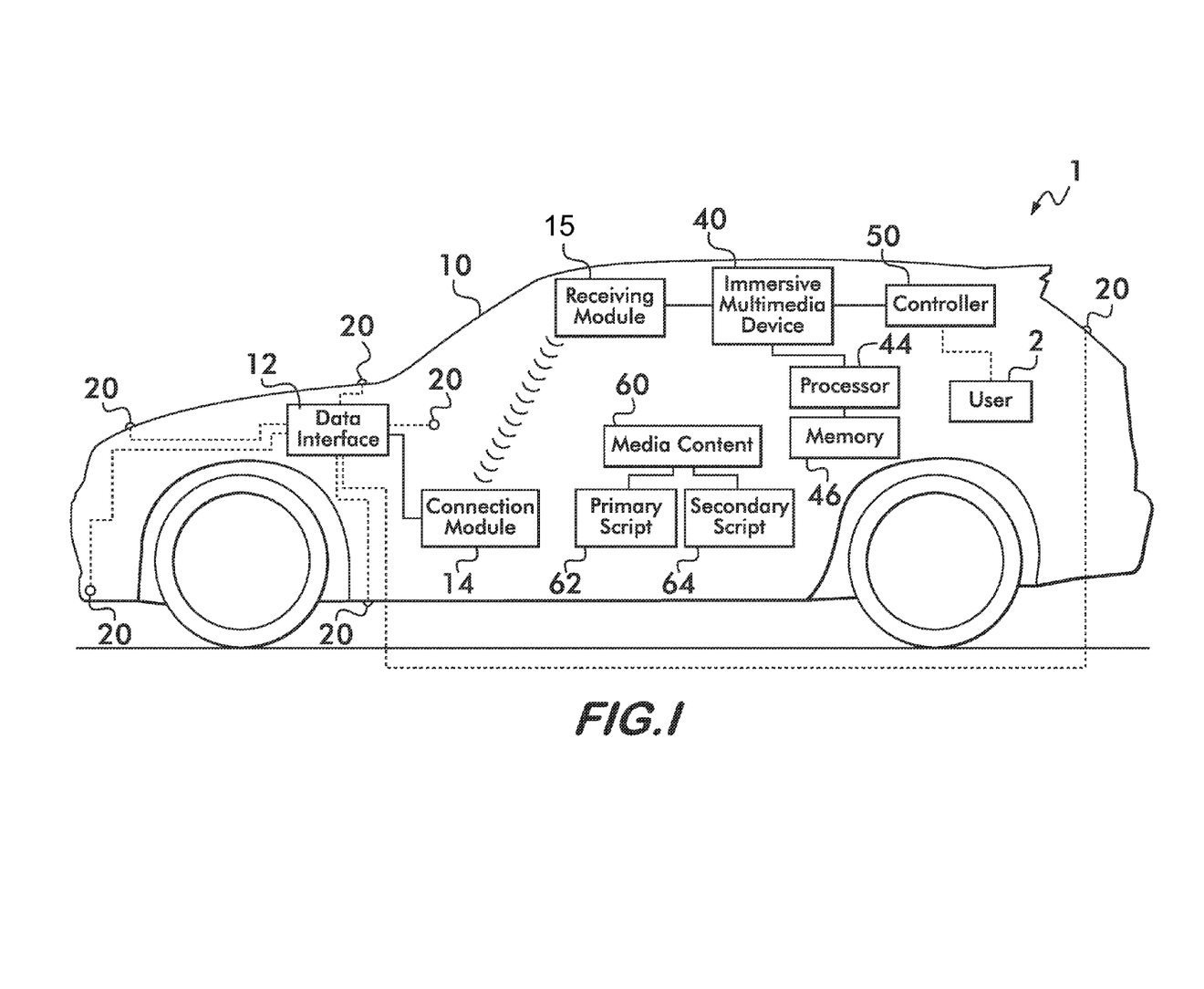
FIG. 1 is a diagram illustrating component pieces of an immersive vehicle multimedia system, according to the invention.

The present invention relates to an immersive multimedia system 1, as shown in Figure 1. The design may include, but is not limited to, a vehicle 10, at least one sensor 20, an immersive multimedia device 40, and media content 60. The immersive multimedia system 1 is employed with in the vehicle 10 to create an immersive multimedia experience for occupants of a vehicle 10.

In the present embodiment, at least one sensor 20 and or vehicle component gathers input from the environment, with the input being environmental and/or current vehicle information such as outside temperature, driving speed, vehicle position, etc. As shown, several vehicle sensors 20 are strategically positioned to collect the appropriate information needed for the immersive multimedia system 1. Each of the sensors 20 are connected to a data interface 12, in the embodiment shown. A discussion regarding communication between the sensors 20 and/or other vehicle components of the immersive vehicle multimedia system 1 will be discussed below.

According to the invention, the data interface 12 collects information for the immersive vehicle multimedia system 1. Not only does the data interface 12 connect to the sensors 2, but it also connects with the immersive multimedia device 40, with the connection between the data interface 12 and the immersive multimedia device 40 being established by sending signals through a connection module 14. By design, the connection module 14 can either be a separate vehicle component or integrally constructed with the data interface 12. Although not shown, the data interface 12 would include a memory 44 and a processor 46, with the memory 44 collecting information from the sensors 20 and/or other vehicle components, and the processor 46 preparing the appropriate data for the immersive multimedia device 40.

As shown in FIG. 1, several sensors 20 are strategically positioned in a variety of locations around the vehicle 10, strategic to acquire information concerning a driving and passenger experience. Each sensor 20 collects particular environmental information or statistics realized by occupants of the vehicle 10, including the driver and passengers. Additionally, other information, such as current vehicle speed, may be collected by other components of the vehicle, such as a speedometer gauge (not shown), which would provide further driving statistics associated with the experience. In essence, any information made available through a vehicle bus system can be made available for use with the immersive multimedia device 1.

Figure 4:
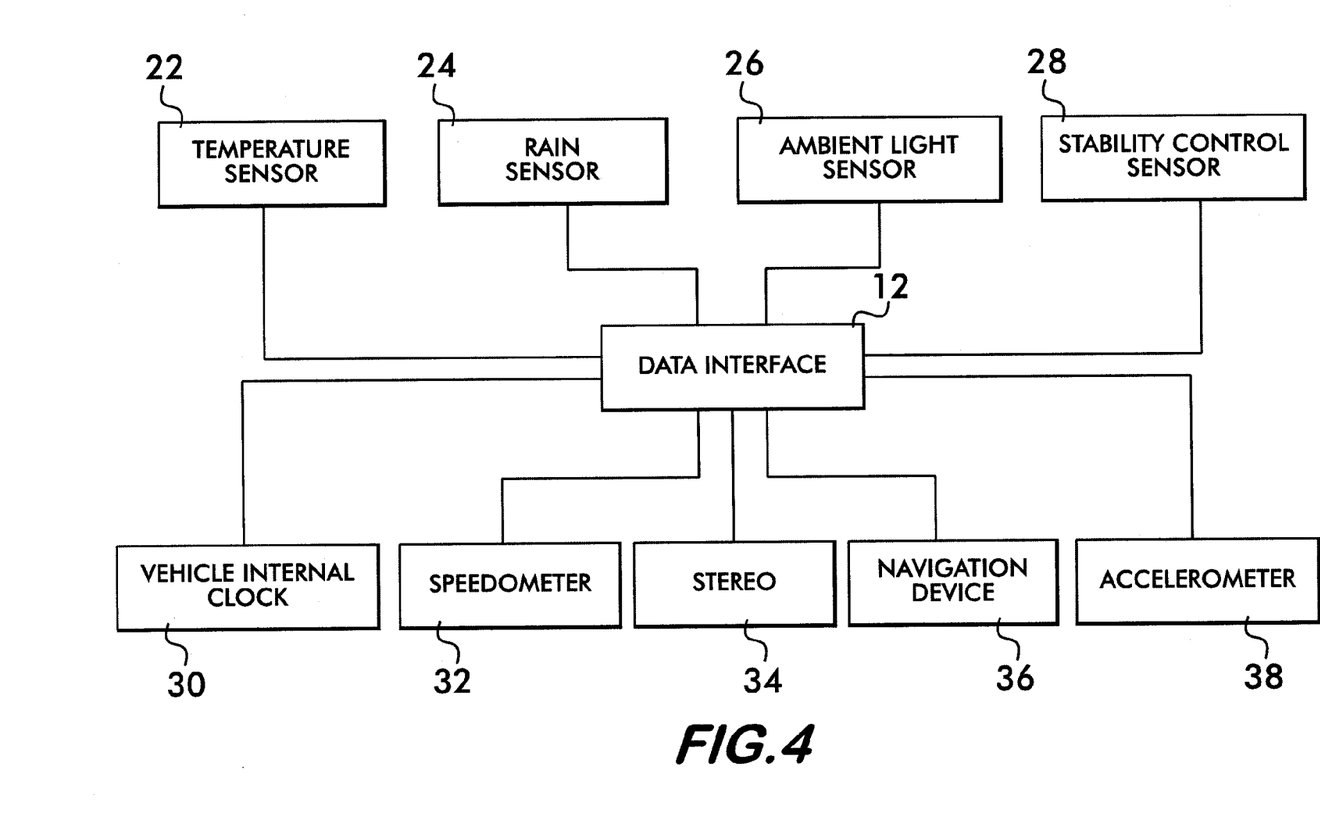
FIG. 4 is a diagram showing various sensors used in the immersive vehicle multimedia system, according to the invention.

FIG. 4 illustrates some of the several sensors 20 and/or other vehicle components that may be used to collect information used to integrate with the immersive multimedia device 40. The immersive vehicle multimedia system 1 tracks vehicle environmental sensing and responsiveness to the occupant experience. Direct measurements of environmental variables, such as temperature and light, as well as other variables available on vehicles such as speed, brake status, and vehicle position, are provided to the data interface 12 using many different vehicle sensors and components. In the embodiment shown, a temperature sensor 22 may be used to monitor and track both external and internal ambient air temperature measurements. A rain sensor 24 may be provided to determine if precipitation is present, and when combined with the measurements from the temperature sensor 22, the data interface 12 may determine a precipitation type (i.e. snow, rain, etc.). An ambient light sensor 26 may be connected to the data interface 12, the ambient light sensor 26 capable of determining if it is night or day. A stability control sensor 28 may provide accurate assessment of road conditions.

Generally, each of these sensors 20 and/or other vehicles components are standard equipment generally installed in the vehicle 10 by an original equipment manufacturer (OEM), before sale of the vehicle 10. For instance, the rain sensor 24 is generally installed in the vehicle 10 to assist with automatic windshield wiper function, while the ambient light sensor 26 may be used to automatically control display brightness and keypad backlighting, as well as other automotive safety and driver comfort features.

As noted, information may be collected from other vehicle components, where the collected information may be collected and then relayed to the data interface 12, which is then further utilized by the immersive multimedia system 1 to affect the presentation of media content 60. A vehicle internal clock 30 may provide a time of day or date, while a speedometer 32 may provide current vehicle 10 speed. In the embodiment shown, the data interface 12 would also connect to a vehicle stereo 34, with the stereo 34 capable of sending information, such as a broadcast frequency, an audio signal, or a digital output. A navigation device 36, either OEM installed or aftermarket, could also connect to the data interface 12, providing the current vehicle position as well as other geographical data. An accelerometer 38, which measures the acceleration it experiences relative to default stability, can be used to send a measurement of orientation, vibration, and/or shock to the data interface 12. Any aftermarket sensors 20 or other vehicle components could connect to the data interface 12 using wired or wireless technology known to the art.

Each of the aforementioned sensors 20 and vehicle components, in the embodiment shown, send information to the data interface 12, with the data interface 12 gathering the information received, so that the information can be further processed, as data packets, by the immersive multimedia device 40. It should be appreciated that the data interface could be an integral component of the immersive multimedia device 40 as well, whereby the immersive multimedia device 40 would collect data from various sensors 20, which are directly connected to the immersive multimedia device 40. However, in the embodiment shown, the data interface 12 is a separate and distinct module to the immersive multimedia device 40. Therefore, the data interface 12 may connect to the immersive multimedia device 40, using either wired or wireless technology.

As discussed above, the data interface 12 includes a connection module 14 that is capable of sending information, such a packets of data, to a receiving module 15, which is connected to the immersive multimedia device 40. By design, the receiving module 15 can either be a separate component or integrally constructed with the immersive multimedia device 40. Regardless of design or construction, the receiving module 40 would be capable of receiving information from the data interface 12 in the embodiment shown. The information sent is then incorporated into a presentation of media content 60, which is run through the immersive multimedia device 40.

According to the invention, the immersive multimedia system 1 relies on communication with the sensors 20 or other vehicle components gathering information, whereby the information collected is then used by the immersive multimedia device 40 to prepare an immersive multimedia experience for the user 2. Therefore, communication must occur between the sensors 20, other vehicle components (i.e. speedometer, internal clock, accelerometer, etc) and the immersive multimedia device 40. In the embodiment shown, communication is performed using the data interface 12, connection module 14, and receiving module 15, which are all connected through wired technology. However, it is possible to have communication provided between the sensors 20, other vehicle components (i.e. speedometer, internal clock, accelerometer, etc) and the immersive multimedia device 40 using other technologies and configurations. For instance, it is possible to have the data interface 12 and immersive multimedia device 40 directly connected to each other, using wires. Additionally, information may be transmitted through the connection module 14 to the receiving module 15, or directly to the immersive multimedia device 40 using wireless technology. Dedicated short-range communication (DSRC) technology, or other known communication technologies, such as IEEE 802.11, Bluetooth and CALM may be used. However, it is also possible to have the immersive multimedia device 40 connect directly to the sensors as well.

The immersive multimedia device 40 is capable of running immersive media content 60, which in the embodiment shown, may include both a primary script 62 and a secondary script 64, as well as other data. According to the invention, the media content 60 may be a mixture of both data and programs, each stored in such a way that the immersive multimedia device 40 could read the media content 60 from a storage device, and then prepare an immersive presentation from the media content 60. The media content 60 may be supported by various video and sound formats, including but not limited to video in .wmv-format, as well as high-definition .wmv-videos, H.264, MPEG-4, and PlaysForSure WMV videos. However, the immersive multimedia device 40 could be adaptable to other video/sound formats that are not readily known. A Digital Video Disc (DVD) or Blu-ray Disc (Blu-ray or BD) are just two types of disc storage devices that could be used to store the media content 60. Other media storage devices could used as well, including a hard drive integrally designed with the immersive multimedia device 40.

Connected to the immersive multimedia device 40 is a controller 50, which enables the user 2 to interact with the immersive multimedia device 40. More specifically, the controller 50 is an input device used to control the immersive multimedia device 40, as well as the media content 60 being presented by the immersive multimedia device 40.

The controller 50 can be a keyboard, mouse, gamepad, joystick, paddle, or any other device designed for interaction that can receive input. The controller 50 can be used to control the type of media content 60 being displayed or govern the movement or actions of an entity in presentation of media content 60. The type of element controlled depends upon the immersive media content 60 being presented. However, in the embodiment shown, the controller 50 would allow the user 2 the ability to control a element's actions and/or movements, or actions performed by the immersive multimedia device 40.

Figure 2A:
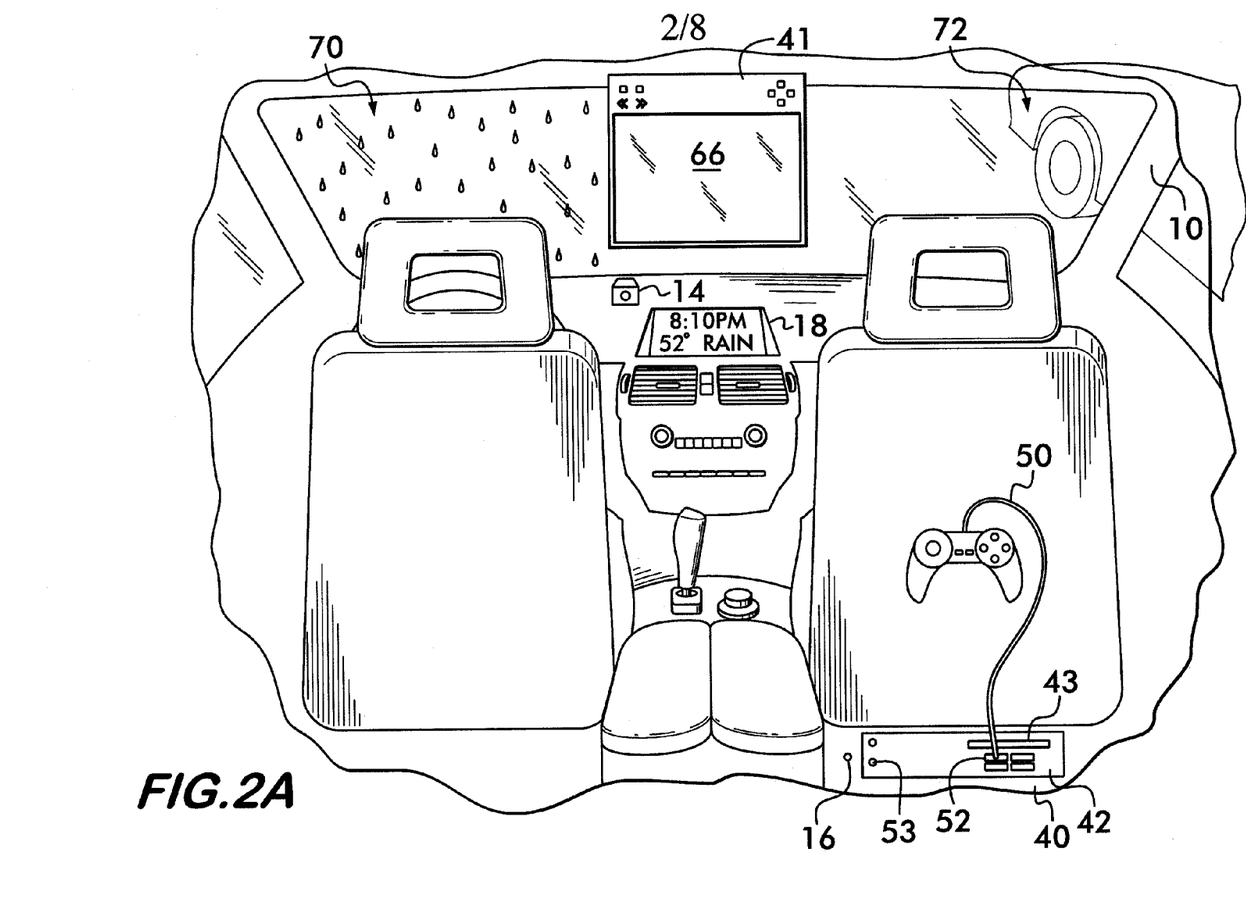
FIG. 2A is a view from the inside of a vehicle, illustrating component pieces of an immersive vehicle multimedia system, according to the invention.

FIG. 2A illustrates one embodiment of the immersive multimedia system 1. As shown, the immersive multimedia device 40 is made up of several components, including an entertainment display 41 and a game console 42. The game console 42 connects to the data interface 12 through either hard wiring or a wireless link between the connection module 14 and a receiving module 16 integrally designed with game console 42. The game console 42 includes a computer system, including a processor 44 and memory 46. This enables the game console 42 to access, read, write, and process information from a storage device holding media content 60. The game console 42 may also include a hard drive (not shown) to store media content 60, or have a drive 43 to accept and read a storage device of media content 60.

The game console 42 may connect to the entertainment display 41 using wired or wireless technology. In the embodiment shown, the entertainment display 41 is a pre-existing display device that was installed by the OEM. This entertainment display 41 is a monitor that is capable of receiving audio and video signals from an immersive multimedia device 40, and presenting those signals for the immersive user experience. The game console 42 would connect to a controller 50 either through a wired input 52 pr through a wireless connection point 53, both well known in the art.

In FIG. 2A, a second display 18 is also shown. The second display 18, in the embodiment shown, is a common dashboard display. The second display 18 may be used to display and control audio and video content, much like well-known in-dash navigation systems, generally installed by an OEM. However, the second display 18 may also provide select information from the vehicles sensors 20 and components. For instance, the time of day, ambient air temperature, and current/future weather conditions may be displayed. As illustrated, rain 70, occurring outside the vehicle 10, is being realized by a sensor 20. The information gathered by this sensor 20 sends data to various vehicle components, including second display 18 and the immersive multimedia system 40. Additionally, a passing car 72 may be realized through other sensors 20. Such information may be used for a vehicle safety system, or may be the type of information that may assist in the experience provided by the immersive multimedia system 1.

In the embodiment shown, the immersive experience provided by the immersive multimedia system 1 depends on a presentation 66 of media content 60, being viewed through the entertainment display 41. The entertainment display 41, as a LCD monitor, runs the video and audio signals that have been sent by the game console 42. These signals will be prepared by the computer system, which is embodied in the game console 42, and directly affected by both the primary and secondary scripts 62, 64 or media content 60.

The primary script 62 of media content 60 provides the data and commands necessary to prepare the multimedia presentation 66. The game play, video, and audio being directed by the primary script 62, and not reliant or affected by any information received from sensors 20 or other vehicle components. The secondary script 64 of media content 60 is additional data and commands that affect additional intangibles, which supplement the game play, video, or audio content in presentation 66. The secondary script 64 may either replace or provide additional game play, video, or audio content provided by the primary script 62, and may be directly affected by the information gathered by the sensors 20 and other vehicle components. As a result, the overall multimedia presentation 66, which may include game play, video, and audio from the primary and secondary script 62, 64 of media content 60, maybe transformed and affected by any information gathered by the sensors 20 and other vehicle components.

Figure 2B:
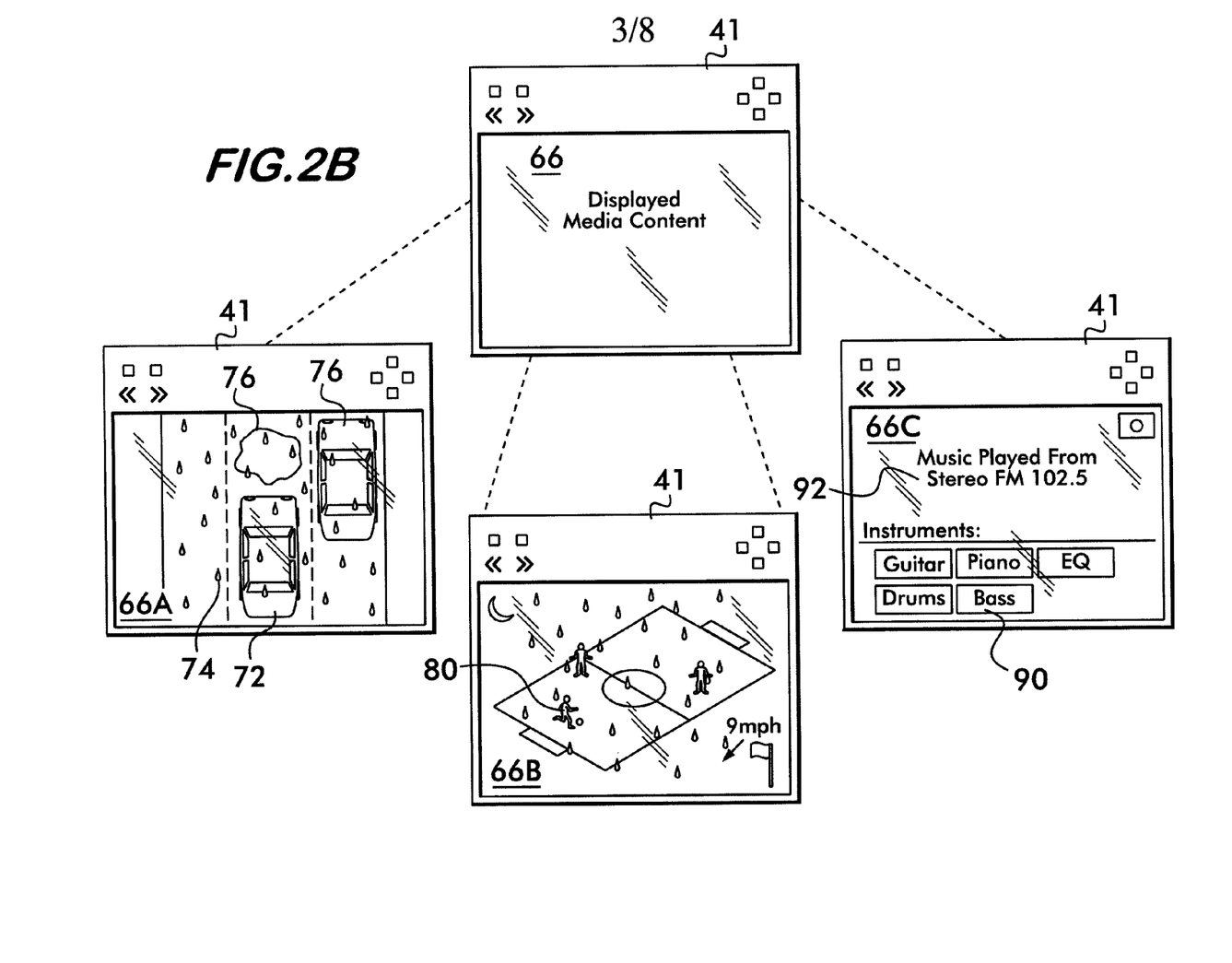
FIG. 2B is an illustrative representation of various media content being displayed through an immersive multimedia device, according to the invention.

For instance, FIG. 2B, illustrates several variations of the multimedia presentation 66A, 66B, and 66C, each of which are displaying separate media content 60 being run through the game console 42.

In exemplary presentation 66A, the media content 60 is displayed as a racing game, whereby the user 2 can interact with various elements within the game. The user 2, through the controller 50, may govern the movement or actions of an entity 72 (a car). The presentation 66A includes game play, audio, and video content, which is being directed by the primary script 62. However, other intangibles, such as weather 74 and obstacles 76, may be directed by the secondary script 64, which may rely on information being received from the sensors 20 or other vehicle components. In the embodiment shown, the weather 74 is controlled through information collected by the sensors 20, as shown in FIG. 2A.

As discussed above, the vehicle 10 may realize both ambient temperature and weather using sensors 20 and other vehicle components (52 degrees and rain respectively in FIG. 2A), which is then included into the presentation 66A. The game play, video and audio would includes similar elements of weather and temperature, as being realized by the sensors 20 and other vehicle components. Additionally, obstacles 76 may be formed in the presentation 66A, and be dependent on other information collected through other vehicle sensors 20 and/or other vehicle components. For instance, in FIG. 2A, a vehicle sensor 20 may also realize a nearby car, possibly through a motion sensor (not shown). When that information (a nearby car) is collected and sent to the immersive multimedia device 40, the presentation 66A would include an obstacle similar to the one realized, or that an obstacle exists in the presentation 66A. The information is being incorporated into the game play, video, and/or audio prepared by the media content 60. This affects the experience by the user, creating an immersive effect, since elements of the game (weather, obstacles, etc) are those similar to the elements experienced by the driver or passenger within the vehicle 10.

The degree at which the secondary script 64 affects the presentation 66 may be directly related to the type of media content (type of game, which is a racing game in the embodiment shown) or information collected by vehicle sensors 20 and/or other vehicle components. If the type of information collected is incompatible with the media content 60 or provides de minimis information for the secondary script 64, then the presentation 66A will run according to the primary script 64. The primary script 64 will always include default data and programs that otherwise would be fulfilled by the secondary script 66 when the appropriate information is received from vehicle sensors 20 and/or other vehicle components.

In exemplary presentation 66B, the media content 60 displays a soccer game though the entertainment display 41. Again, the user 2 is allowed to interact with various elements within the game; this time the user 2 interacts with a player 80 on the field, governing the movement or actions of the player 80 as well as a ball 82. The presentation 66B also includes game play, audio, and video content, which is again being directed by the primary script 62. However, other elements are being affected in presentation 66B. The weather, time of day, wind speed, etc, may also be in accordance with any of the information collected by the sensors 20 and/or other vehicle components. The media content 60 incorporates the received information, affecting the game play, video, and/or audio content being displayed in presentation 66B. This also affects the experience by the user, creating an immersive effect, since elements of the game (weather, time of day, wind speed, etc) match the elements experienced by the user 2, as passenger in the vehicle.

Furthermore, in FIG. 2B, a third exemplary presentation 66B is shown. This is a different type of media content 60, wherein the game play, video, and/or audio is directly affected by information received from sensors 20 and/or other vehicle components. In the embodiment shown, the audio content 92 is directly affected by the audio signal sent from the car stereo 34 (another vehicle component shown in FIG. 4). The user 2 has the ability to interact with audio content 92, by selecting a type of instrument 90, and then playing along or modifying the existing sound. As a result, the user 2 realizes an immersive affect within the vehicle surroundings. Additionally, the sound of the instruments may be affected by other information received from the sensors 20 and/or other vehicle components. For instance, the range, distortion, etc of the instrument 90, may be affected, whereby the speed of the vehicle (speedometer 32) affects the pitch and movement (accelerometer 38) affects distortion. The user 2 experience is affected by environmental factors as well as the current vehicle conditions.

In the embodiment shown, additional inputs, such as a wireless headphone (not shown), may be used in connection with the immersive multimedia system 1. Therefore, the immersive experience, specifically any audio content, may be realized by one or more passengers, without having all occupants having to experience the immersive multimedia system 1.

Figure 3:
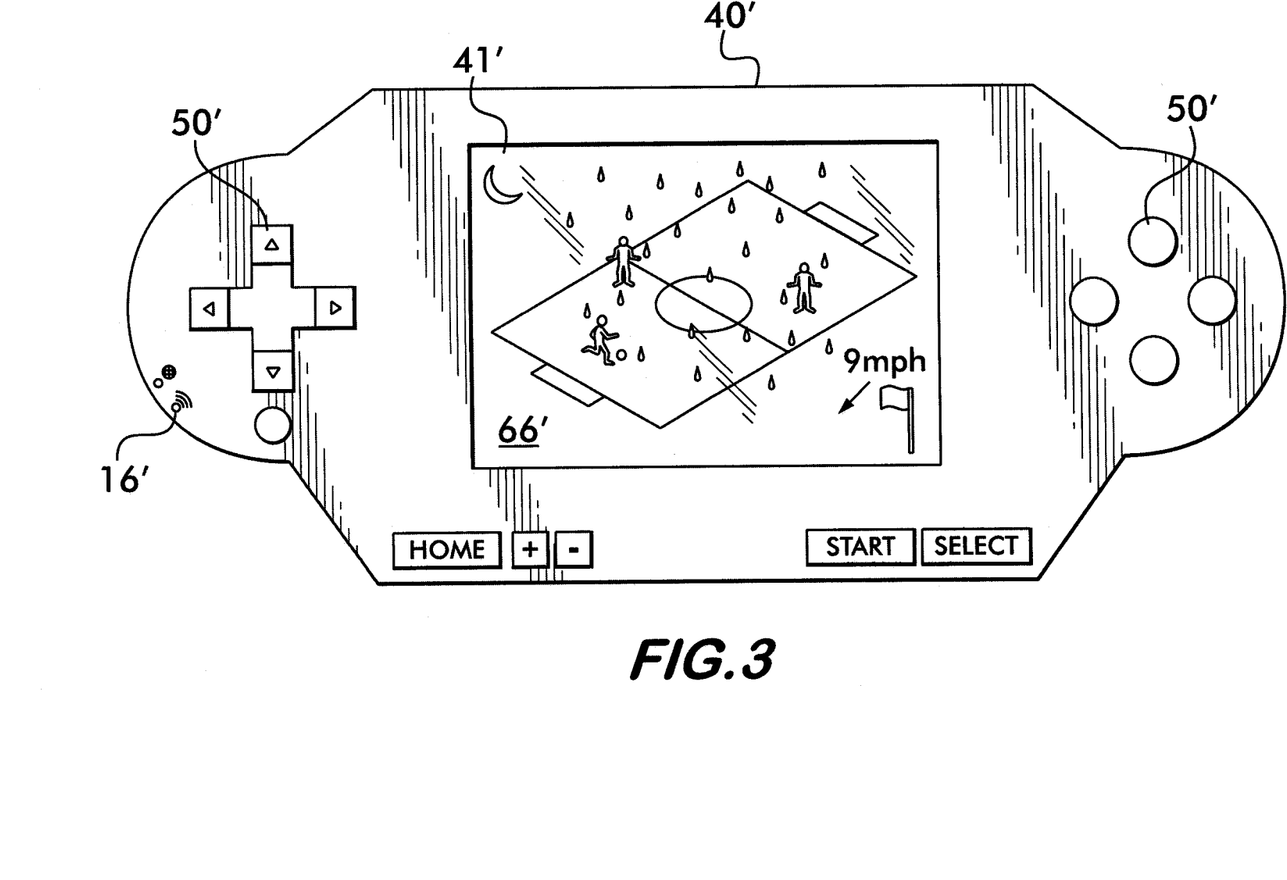
FIG. 3 is an illustrative representation of media content being displayed through another embodiment of the immersive multimedia device, according to the invention.

FIG. 3 shows another embodiment of the immersive multimedia device 40. This immersive multimedia device 40 is a handheld game console 40' that a portable device having a built-in screen 41', games controls 50', and speakers (not shown). Unlike the game console 42, the handheld game console 40' includes the controls 50', screen 41', and speakers (not shown) in a single unit. However, like the game console 42, the handheld game console 40' runs media content 60 in much the same way. In the embodiment shown, the handheld game console 40' is a portable game system, similar to a Sony PSP or Nintendo DS, or other known portable gaming device. The handheld game console 40' may also be a smartphone, personal digital assistant (PDA), personal media player (iTouch/iPhone), etc. However, the handheld game console 40' much be a type that does not compromise the immersive multimedia system's 1 ability to gather information, from vehicle sensors 20 and/or other vehicle components, and integrate that information into the immersive experience is compromised.

The same media content 60 being run in presentation 66B (see FIG. 2B), in this example, is being run in presentation 66' through the handheld game console 40'. The handheld game console 40' connects to the sensors 20 and/or other vehicle components in much the same way as described above, except the handheld game console 40' connects to the connection module 14 through a wired or wireless technology. In the embodiment shown, the handheld game console 40' includes a wireless receiving module 16' capable of receiving signals through a known wireless technology. Additionally, the handheld game console 40' could connect to the connection module 14 through known wired technology, although it would not be as convenient. In order to create an immersive user experience, the handheld game console 40' would have to be compatible with the immersive media content 60.

The structure of the immersive multimedia system 1, including individual components, has been described. Now, some of the common steps performed by the immersive multimedia system 1 will be described, with reference to FIGS. 5 through 7.

Figure 5:
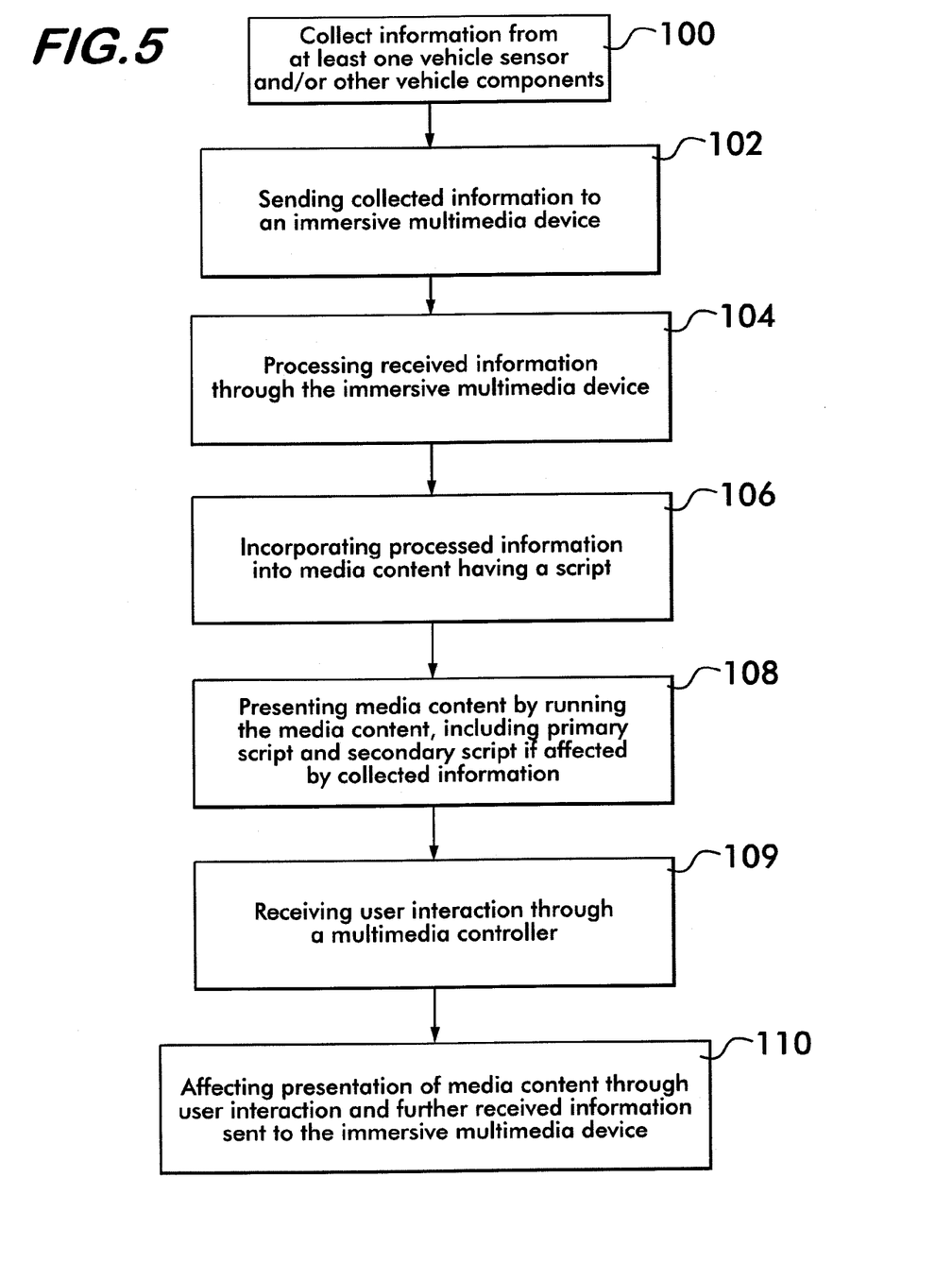
FIG. 5 is a flow diagram illustrating a method for preparing an immersive multimedia experience in a vehicle, according to the invention.

FIG. 5 describes a simplified process for preparing an immersive multimedia experience in a vehicle 10 using the immersive multimedia device 1. At step 100, the vehicle sensors 20 and/or other vehicles components collect information concerning environmental and current driving conditions. That information is may be gathered by a data interface 12, which can further consolidate the incoming data, and then prepare it for further processing by the immersive multimedia system 1. The data interface 12 can decide what type of collected information is appropriate for the immersive multimedia system 1, or for the type of media content 60 presently being used.

The gathered information is then sent to the immersive multimedia device 40 if determined appropriate for the immersive multimedia system 1, or appropriate for the type of media content 60 presently being used. If the immersive multimedia device 40 connects directly to the sensors 20 and/or other vehicle components, then any gathered information would being sent to the immersive multimedia device 40, with the immersive multimedia device 40 determining what information is appropriate.

The information is then processed by the immersive multimedia device 40 at step 104, where the information is then incorporated into a presentation 66 of the media content 60. In particular, select information will be incorporated into various elements of the presentation, including but not limited to game play, video, and/or audio.

Figure 6:
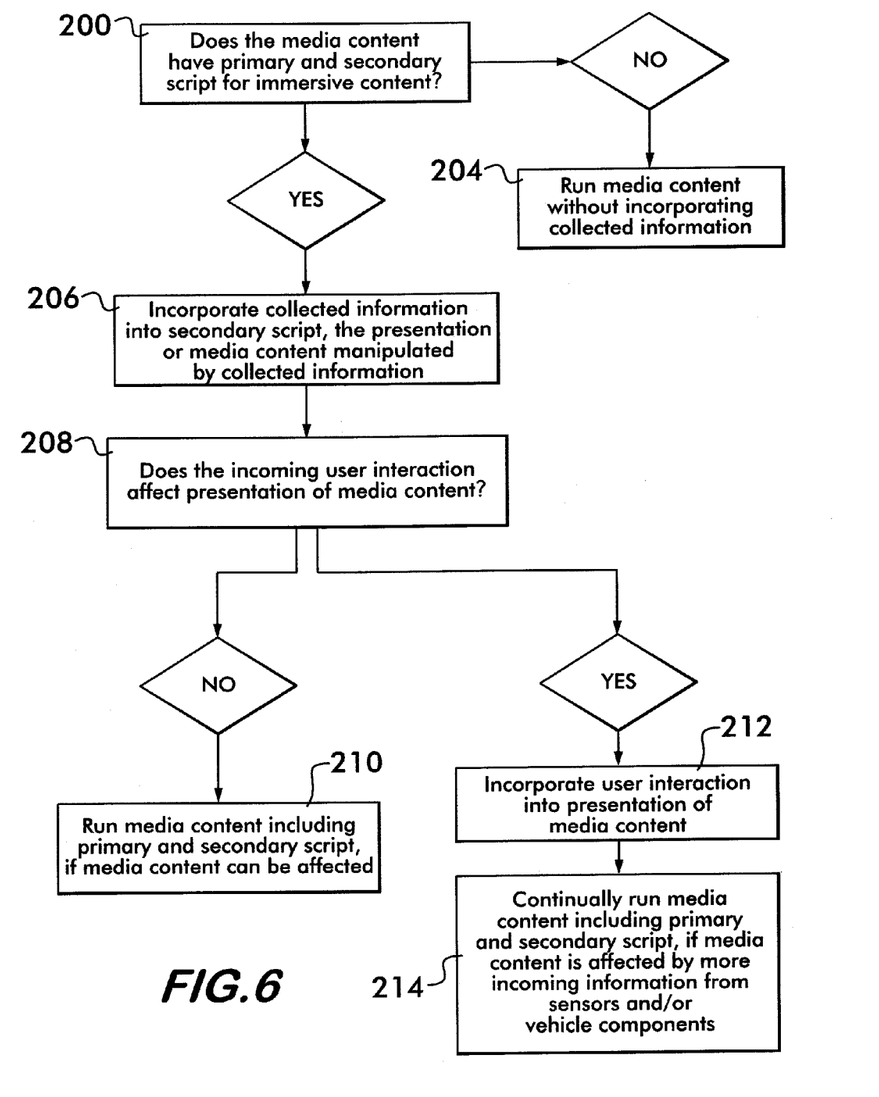
FIG. 6 is a flow diagram illustrating the decisional process regarding media content run through the immersive multimedia system, according to the invention.

Although simplified, FIG. 6 describes the process, where the collected information is incorporated into the presentation 66 of media content 60. If the media content 60 is not compatible for an immersive multimedia experience, then the immersive multimedia device 40 will run whatever media content 60 without incorporating any collected information from the sensors 20 and/or other vehicle components. As a result, the immersive experience will not be achieved. However, if the media content 60 is compatible for the immersive multimedia experience, then the media content 60 may have a primary and secondary script 62, 64 for immersive content.

There does not need to be actual primary and secondary script 62, 64 within the media content. Rather, the primary script 62 would relate to data and programs, within the media content 60, that is not affected by information coming in from the sensors 20 and/or other vehicle components, while the secondary script 64 would be the data and programs that may be affected by incoming information from the sensors 20 and/or other vehicle components.

As discussed above, only some of the collected information will be considered appropriate to incorporate into the media content 60. For instance, a particular games, such as the racing game (presentation 66A in FIG. 2B), may only incorporate information relating to the weather (as rain 74, or obstacles 76), proximate vehicles (as an obstacle 76), etc. It may be determined that certain information, such as radio frequency 92 (see presentation 66C, FIG. 2B), is appropriate to incorporate into different types of media content 60, such as the racing game in presentation 66A.

If the collected information is determined appropriate for the media content 60 being run through the immersive multimedia device 40, then the collected information will be incorporated in the secondary script 64 of media content 60 (step 206). The presentation 66 of media content 60 is then manipulated by the collected information, having the presentation 66 altered by information regarding the surrounding conditions observed and realized by the vehicle sensors 20 and/or other vehicle components.

Since the immersive multimedia system 1 is interactive, then the user 2 has the ability to further interact with game play, video, and audio, through a presentation 66 of media content 60. Therefore, the user 2 can further manipulate the presentation 66 of media content 60 (see FIG. 5, step 109).

If the user interaction affects the game play, video, and/or audio, being run through by the media content 60, then the presentation 66 will reflect those changes to game play, video, and/or audio resulting from user 2 interactions (FIG. 6, step 212). The user 2 may continuously interact with the presentation 66 of media content 60. Therefore, the media content 60 will continue to run without the presentation 66 being manipulated by user 2 interactions, but may be by incoming collected information from the sensors 20 and/or other vehicle components (FIG. 6, step 210). As the media content 60 continues to run through the immersive multimedia device 40, the incoming collected information user 2 may continue to affect the presentation 66 of media content (FIG. 6, step 214).

The aforementioned processes and steps will repeat as long as the immersive multimedia system 1 continues to run one type of media content 60, or until the immersive multimedia device 40 is reset. As a result, the presentation 66 of media content 60 is continuously being affected by the information collected and sent from the sensors 20 and/or other vehicle components. Since the immersive multimedia system 1 is interactive, the presentation 66 of media content 60 is also continuously being affected by user 2 interaction as well (FIG. 5, step 110).

Figure 7:
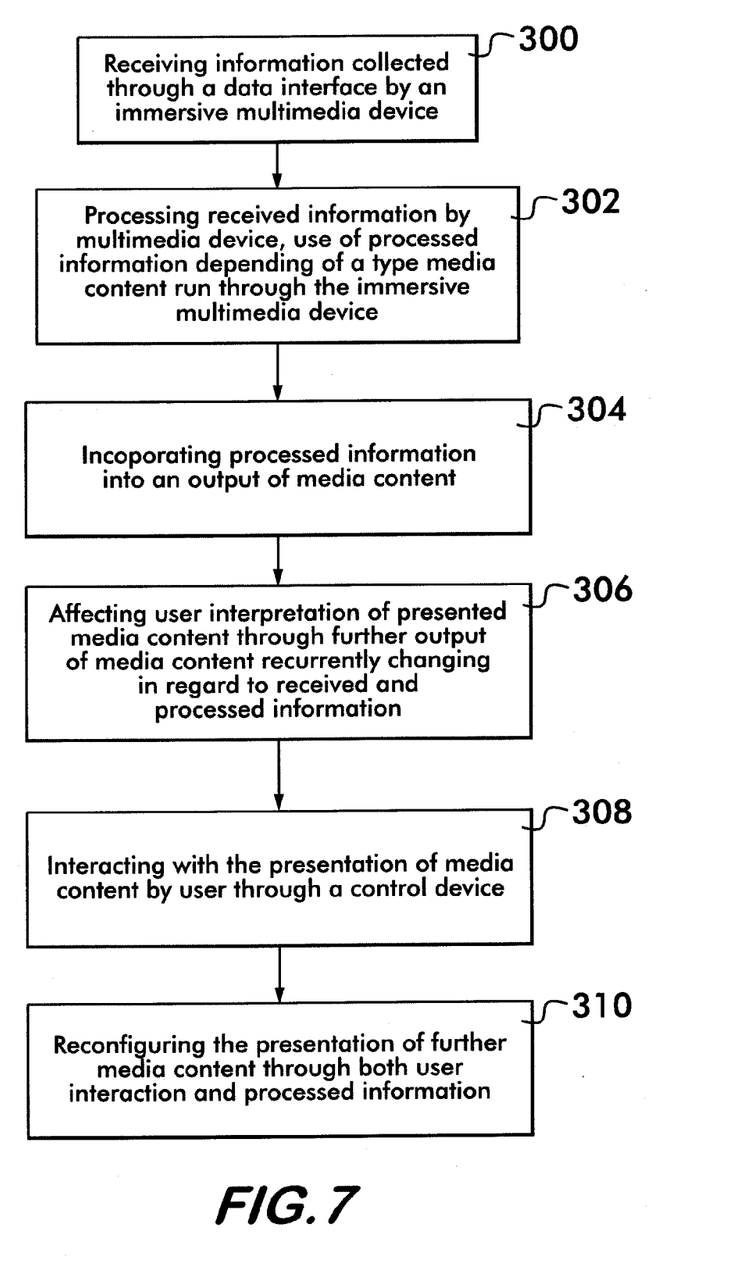
FIG. 7 is a flow diagram illustrating a method to manipulate media content run through an immersive vehicle multimedia system, according to the invention.

The immersive multimedia system 1 provides a method to manipulate media content 60, which is being run through the immersive multimedia device. FIG. 7 illustrates this process, although a bit simplified.

As discussed above, information, as input, is collected and received through sensors 20 and/or other vehicle components that have been strategically positioned around the vehicle 10. That information is collected and packaged by the data interface 12, with the information being continuously or periodically collected. Once prepared for transmission, the information is then sent to the immersive multimedia device 40 (step 300). The communication of this information being performed using a variety of technologies, which may be known wired and/or wireless technologies. Even if the information is collected periodically, the immersive multimedia system 1 is designed such that the information may be transferred between the sensors 20 and/or other vehicle components and the immersive multimedia device 40 at any time, a sort of open line of communication between each component of the immersive multimedia system 1. In certain situations, the immersive multimedia device 40 may communicate back with the sensors 20 and/or other vehicle components.

Once the immersive multimedia device 40 receives the collected information, that information is processed, with the use of processed information depending of the type media content 60 run through the immersive multimedia device 40 (step 302). A determination to use the collected and processed information, in addition to the extent of information used, has been discussed above. If determined appropriate, the processed information is incorporated into an output of media content 60, which would be a presentation 66 of media content 60, with the presentation 66 is altered and affected by the collected information, either continuously or periodically.

As the presentation 66 changes, the user's 2 interpretation of the presented media content 66 changes as well. The presentation 66 may include realized vehicle conditions or perceived current external conditions, which are incorporated into the presentation 66. The changes to the presentation 66 may match the realized vehicle conditions or perceived current external conditions, or the presentation 66 may be changed in such a way that the collected information provides a simulation to the perceived passenger experience. The information may affect the game play, video, and/or audio.

The presentation 66 may also be changed and manipulated by user 2 through interaction with an input device, such as a controller 50. Therefore, the presentation 66 may be continuously reconfigured, altered or manipulated by user interaction and/or processed information.

Overall, this affects the experience by the user 2, creating an immersive effect, since elements of the presentation 66 (weather, obstacles, etc) are those similar to the elements experienced by the driver or passenger within the vehicle 10.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. An immersive vehicle multimedia system that provides a passenger with an immersive experience, comprising:
    a vehicle;
    at least one original equipment manufacturer sensor or other original equipment manufacturer vehicle component gathering input as data from an external and internal vehicle environment;
    an immersive multimedia device disposed within the vehicle and connected to each original equipment manufacturer sensor through a data interface; and
    media content run through the multimedia device, the media content having a primary script to prepare a multimedia presentation using the media content to a user and a secondary script that includes additional data and commands for providing supplemental data in the primary script that depends on content of the gathered input data, such that the immersive multimedia device incorporates the gathered input data into the multimedia presentation through the secondary script in real-time.

2. The immersive vehicle multimedia system of claim 1, wherein the gathered input data is sendable by a connection module.

3. The immersive vehicle multimedia system of claim 1, wherein the gathered input data includes information concerning present driving conditions.

4. The immersive vehicle multimedia system of claim 1, further comprising an immersive multimedia processor to incorporate the gathered input data sent from the original equipment manufacturer sensor or other original equipment manufacturer vehicle component with the media content, such that the media is capable of incorporating the gathered input data with the secondary script.

5. The immersive vehicle multimedia system of claim 4, further comprising a controller for user interaction.

6. The immersive vehicle multimedia system of claim 1, wherein the gathered input data includes present vehicle conditions.

7. The immersive vehicle multimedia system of claim 6, wherein the gathered input data includes present environmental conditions.

8. The immersive vehicle multimedia system of claim 1, wherein communication between the original equipment manufacturer sensor or other original equipment manufacturer vehicle component and the multimedia device is a constant communication.

9. The immersive vehicle multimedia system of claim 1, wherein communication between the original equipment manufacturer sensor or other original equipment manufacturer vehicle component and the multimedia device is a periodic communication.

10. The immersive vehicle multimedia system of claim 1, wherein communication between the original equipment manufacturer sensor or other original equipment manufacturer vehicle component and the multimedia device is an indirect communication including a wireless communication system.

11. The immersive vehicle multimedia system of claim 1, further comprising wiring between the original equipment manufacturer sensor or other original equipment manufacturer vehicle component and the multimedia device.

12. The immersive vehicle multimedia system of claim 1, wherein the secondary script provides supplemental data for the primary script.

13. The immersive vehicle multimedia system of claim 12, wherein the secondary script replaces game play, video, or audio content provided by the primary script.

14. The immersive vehicle multimedia system of claim 1, wherein the secondary script replaces game play, video, or audio content provided by the primary script.

15. The immersive vehicle multimedia system of claim 1, wherein the secondary script provides the real-time environmental representation from the received external and internal information to the multimedia device.

16. A method for preparing an immersive multimedia experience in a vehicle, comprising the steps of:
    gathering external and internal information from at least one original equipment manufacturer sensor or other original equipment manufacturer vehicle component;
    sending gathered external and internal information as real-time environmental data automatically to an immersive multimedia device disposed in the vehicle through a data interface;
    processing the received real-time environmental data through the immersive multimedia device;
    automatically incorporating the processed received real-time environmental data into the media content;
    preparing a presentation from the media content using the immersive multimedia device, the presentation displaying material from the real-time environmental data; and
    receiving user interaction through a multimedia controller, wherein the user interaction and further received real-time environmental data affects further presentation of from the media content.

17. The method for preparing an immersive multimedia experience in a vehicle of claim 16, wherein presenting the media content includes the step of running a primary script and a secondary script of the media content, the primary script initially preparing the presentation of the media content, while the secondary script further preparing the material for the presentation if the processed real-time environmental data is determined appropriate for the media content.

18. The method for preparing an immersive multimedia experience in a vehicle of claim 17, further including the step of determining if the received and processed real-time environmental data is appropriate, real-time environmental data influencing the presentation of the media content partially controlled by the secondary script of the media content.

19. A method to manipulate media content run through an immersive vehicle multimedia system, the steps comprising:
    receiving external and internal information collected through original equipment manufacturer vehicle components;
    sending the external and internal information as real-time environmental data through a data interface to an immersive multimedia device disposed in a vehicle;
    processing the received external and internal information through the immersive multimedia device, use of the processed external and internal information depending on a type of media content run through the immersive multimedia device;

automatically incorporating the processed external and internal information into a presentation of the media content having a real-time environmental representation corresponding to the gathered external and internal information;

affecting user interpretation of the presented media content through further output of the media content recurrently changing in regard to the received and processed external and internal information;

interacting with the presentation of the media content by a user through a control device; and reconfiguring a further real-time presentation of the media content through both user interaction and processed information.

20. An immersive vehicle multimedia system that provides a passenger with an immersive experience, comprising:

a vehicle;

an existing vehicle component gathering input as data from an external and internal vehicle environment;

an immersive multimedia device disposed within the vehicle and connected to the existing vehicle component; and media content run through the immersive multimedia device and having a primary script to prepare a multimedia presentation using the media content to a user and a secondary script that includes additional data and commands for providing supplemental data in the primary script to provide a real-time external and internal vehicle environment presentation through the immersive multimedia device.

21. The immersive vehicle multimedia system of claim 20, wherein the existing vehicle component is an original equipment manufacturer vehicle sensor.

* * * * *